US012672164B2

(12) United States Patent
Miao

(10) Patent No.: US 12,672,164 B2
(45) Date of Patent: Jun. 30, 2026

(54) INFORMATION CONFIGURATION METHOD, DATA TRANSMISSION METHOD, AND APPARATUS

(71) Applicant: DATANG MOBILE COMMUNICATIONS EQUIPMENT CO., LTD., Beijing (CN)

(72) Inventor: Jinhua Miao, Beijing (CN)

(73) Assignee: DATANG MOBILE COMMUNICATION EQUIPMENT CO., LTD., Beijing (CN)

( * ) Notice: Subject to any disclaimer, the term of this patent is extended or adjusted under 35 U.S.C. 154(b) by 625 days.

(21) Appl. No.: 17/419,276

(22) PCT Filed: Oct. 25, 2019

(86) PCT No.: PCT/CN2019/113185
§ 371 (c)(1),
(2) Date: Jun. 28, 2021

(87) PCT Pub. No.: WO2020/134446
PCT Pub. Date: Jul. 2, 2020

(65) Prior Publication Data
US 2022/0078813 A1 Mar. 10, 2022

(30) Foreign Application Priority Data

Dec. 29, 2018 (CN) .......................... 201811646200.9

(51) Int. Cl.
*H04W 72/12* (2023.01)
*H04W 24/08* (2009.01)
(Continued)

(52) U.S. Cl.
CPC ......... *H04W 72/569* (2023.01); *H04W 24/08* (2013.01); *H04W 72/23* (2023.01)

(58) Field of Classification Search
None
See application file for complete search history.

(56) References Cited

U.S. PATENT DOCUMENTS

2011/0092201 A1* 4/2011 Lindstrom ............ H04W 24/10
455/424
2017/0006510 A1* 1/2017 Kaikkonen ........... H04W 48/16
(Continued)

FOREIGN PATENT DOCUMENTS

CN 101646251 A 2/2010
CN 101686551 A 3/2010
(Continued)

OTHER PUBLICATIONS

Ericsson, "MAC Handling of Measurement Gaps", TSG-RAN WG2 Meeting #63, Jeju, Korea, Aug. 18-Aug. 22, 2008, total 3 pages, R2-083889.
(Continued)

*Primary Examiner* — Jeffrey M Rutkowski
*Assistant Examiner* — Mehedi S Aley
(74) *Attorney, Agent, or Firm* — KILPATRICK TOWNSEND & STOCKTON LLP

(57) ABSTRACT

The present application discloses an information configuration method, a data transmission method, and an apparatus, for solving the problem in which a measurement gap blocks data transmission and accordingly increases a transmission delay. An embodiment of the present application includes a network-side apparatus configuring indication information of a priority level of a channel with respect to that of a measurement gap; a terminal receiving the indication information, and performing configuration according to the indication information; and if the measurement gap and the channel for transmitting data overlap, the terminal determining, according to the priority level indicated by the
(Continued)

800

A network device determines the indication information for indicating the priority of a channel corresponding to a measurement gap

801

The network device configures the indication information for a user equipment, so that the user equipment determines whether to transmit data through the channel according to the priority indicated by the indication information when the channel overlaps with the measurement gap indication information, whether to continue measurement or to transmit data via the channel.

9 Claims, 4 Drawing Sheets

(51) Int. Cl.
    *H04W 72/23*       (2023.01)
    *H04W 72/566*     (2023.01)

(56)         References Cited

U.S. PATENT DOCUMENTS

| | | | |
|---|---|---|---|
| 2017/0127397 A1 | 5/2017 | Hahn et al. | |
| 2018/0324619 A1* | 11/2018 | Harada | H04W 24/10 |
| 2019/0149273 A1* | 5/2019 | Golitschek Edler Von Elbwart | H04L 1/1864 714/748 |

| | | | |
|---|---|---|---|
| 2019/0174341 A1* | 6/2019 | Chincholi | H04B 17/336 |
| 2019/0200386 A1* | 6/2019 | Yang | H04W 74/0808 |
| 2019/0289661 A1* | 9/2019 | Chen | H04W 24/10 |
| 2021/0289537 A1* | 9/2021 | Qin | H04L 1/1825 |

FOREIGN PATENT DOCUMENTS

| | | | | |
|---|---|---|---|---|
| CN | 102084682 A | 6/2011 | | |
| CN | 102938903 A | 2/2013 | | |
| EP | 2152040 A1 | 2/2010 | | |
| WO | WO-2017028046 A1 * | 2/2017 | | H04W 24/04 |

OTHER PUBLICATIONS

ZTE, "Discussion on measurement gap of DC", 3GPP TSG-RAN2 Meeting #86, Seoul, Korea, May 19-23, 2014, total 4 pages, R2-142013.

* cited by examiner

Not
transmit

Delay in
transmitting

Measurement gap

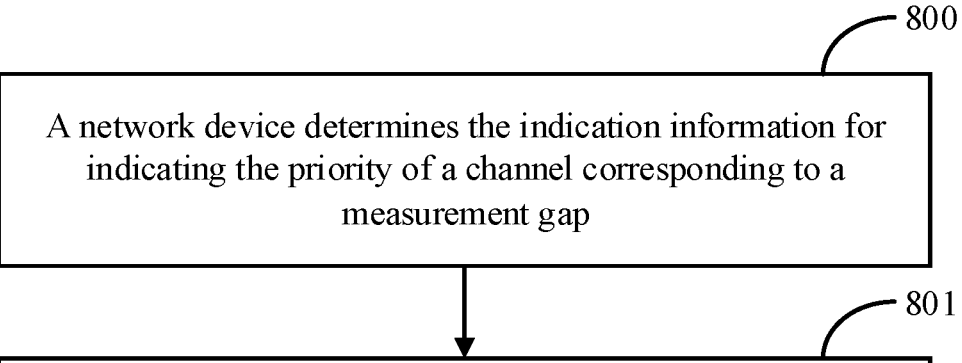

A network device determines the indication information for indicating the priority of a channel corresponding to a measurement gap The network device configures the indication information for a user equipment, so that the user equipment determines whether to transmit data through the channel according to the priority indicated by the indication information when the channel overlaps with the measurement gap

Fig. 8

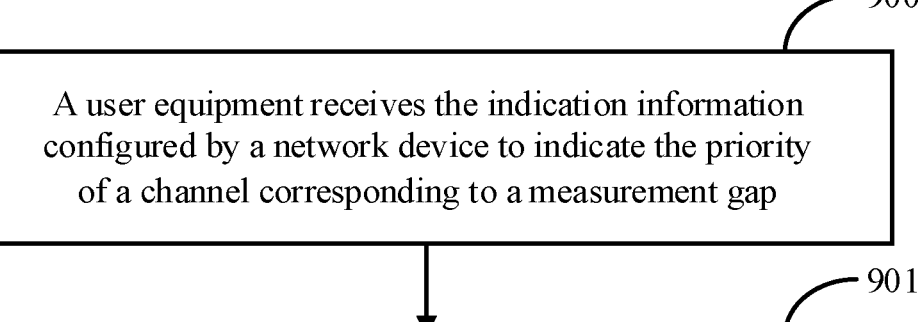

A user equipment receives the indication information configured by a network device to indicate the priority of a channel corresponding to a measurement gap The user equipment transmits data through the channel when the channel overlaps with the measurement gap and when determining that the priority of the channel is higher than the priority of the measurement gap according to the indication information

Fig. 9

INFORMATION CONFIGURATION METHOD, DATA TRANSMISSION METHOD, AND APPARATUS

The application is a US National Stage of International Application No. PCT/CN2019/113185, filed Oct. 25, 2019, which claims the priority from Chinese Patent Application No. 201811646200.9, filed with the Chinese Patent Office on Dec. 29, 2018 and entitled "Method and Apparatus for Information Configuration and Data Transmission", which is hereby incorporated by reference in its entirety.

FIELD

The application relates to the field of communication technologies, and particularly to a method and apparatus for information configuration and data transmission.

BACKGROUND

In the NR (New Radio) system, a UE (User Equipment) measures neighboring cells. For example, during the cell switching, the UE needs to measure the signal quality of the target cell and report it to the network, and the network decides whether to allow the UE to switch to the target cell based on this.

The measurements of neighboring cells include the measurement of intra-frequency cells and the measurement of inter-frequency cells. If the target cell and the current cell (that is, the cell currently serving the UE) are on the same carrier frequency (center frequency), there is no problem for the UE to measure the signal quality of the target cell. However, if the target cell and the current cell are not on the same carrier frequency, a general UE can only receive and process signals with the same frequency at the same time because it only has a set of receiver. If the signals with other frequencies is to be measured, the receiver switches the frequency to the target frequency for measurement.

Therefore, the 3GPP (Third Generation Partnership Project) proposes a measurement method—measurement Gap, that is, reserve a part of time (the time of the measurement gap), during which time the UE no longer transmits or receives any data except for the data related to the random access process and adjusts the receiver to the frequency of the target cell for inter-frequency measurement.

In order to ensure that the UE can get the better quality of service, the UE needs to support the measurement. However, during the measurement gap, except for the random access related data, the UE does not perform other scheduling (uplink and downlink) transmissions except for the random access process. If the UE has an uplink data transmission requirement or needs to receive the data during the measurement gap, it needs to wait for the measurement to be completed, which results in the increase in data transmission delay.

To sum up, the data cannot be transmitted due to the measurement gap at present, and increasing the transmission delay.

SUMMARY

The application provides a method and apparatus for information configuration and data transmission, to solve the problem that the data cannot be transmitted due to the measurement gap to increase the transmission delay.

In one embodiment, a method for information configuration according to an embodiment of the application includes:

determining, by a network device, indication information for indicating a priority of a channel corresponding to a measurement gap;

configuring, by the network device, the indication information for a user equipment, so that the user equipment determines whether to transmit data through the channel according to the priority indicated by the indication information when the channel overlaps with the measurement gap.

In the above method, the network device configures the indication information of the priority of the channel corresponding to the measurement gap for the user equipment, and the user equipment receives the indication information and performs the configuration according to the indication information. When the measurement gap overlaps with the channel for data transmission, the user equipment determines whether to continue the measurement or to transmit data through the channel according to the priority indicated by the indication information. For scenarios with high delay requirement, the network side can configure the higher priority of the channel corresponding to the measurement gap for the user equipment. When they overlap, the user equipment can continue transmitting the data, avoiding the transmission delay caused by the measurement gap and reducing the transmission delay.

In one embodiment, configuring, by the network device, the indication information for the user equipment includes: configuring, by the network device, the indication information for the user equipment through RRC (Radio Resource Control) signaling; or configuring, by the network device, the indication information for the user equipment through physical layer signaling; or configuring, by the network device, the indication information for the user equipment through configuration information of a logical channel.

In one embodiment, the network device configures the indication information for the user equipment through RRC signaling; and determining, by the network device, indication information for indicating a priority of a channel corresponding to a measurement gap, includes: determining, by the network device, a parameter of configured grant as the indication information; or determining, by the network device, priority information of PUCCH (Physical Uplink Control Channel) transmission as the indication information.

In one embodiment, when the priority information of the PUCCH transmission is priority information of a CSI (Channel Status Indicator) report, the indication information is used to indicate a priority of a channel corresponding to the CSI corresponding to the measurement gap; or when the priority information of the PUCCH transmission is priority information of an SR (Scheduling Request), the indication information is used to indicate a priority of a channel carrying the SR corresponding to the measurement gap; or when the priority information of the PUCCH transmission is priority information of an HARQ (Hybrid Automatic Repeat reQuest) feedback, the indication information is used to indicate a priority of a channel carrying the HARQ feedback corresponding to the measurement gap.

In one embodiment, the priority information of the PUCCH transmission is the priority information of the SR; and configuring, by the network device, the indication information for the user equipment through RRC signaling, includes: transmitting the SR configuration information to the user equipment through RRC signaling, and the SR configuration information includes the priority information of the SR.

In one embodiment, the indication information is used to indicate a priority of one of a PDSCH (Physical Downlink Shared Channel), a PUSCH (Physical Uplink Shared Channel) and a PUCCH corresponding to the measurement gap.

In one embodiment, when the network device configures the indication information for the user equipment through RRC signaling; or the network device configures the indication information for the user equipment through physical layer signaling, the network device indicates the priority of the channel corresponding to the measurement gap by setting a value of priority or flag.

In one embodiment, when the network device configures the indication information for the user equipment through the configuration information of the logical channel, the indication information is used to indicate a priority of a PUSCH corresponding to the measurement gap or indicate a priority of a PUCCH corresponding to the measurement gap.

In one embodiment, when the network device configures the indication information for the user equipment through the configuration information of the logical channel, the indication information is a part or all of:

priority information;

flag;

a maximum duration of a PUSCH configured for the logical channel;

an SCS (SubCarrier Space) configured for the logical channel;

information for indicating whether the logical channel allows the use of pre-configured grant;

information for indicating whether the logical channel allows repeated transmission.

In one embodiment, the logical channel is a logical channel used for triggering SR configuration.

In one embodiment, the method further includes:

configuring, by the network device, a duration for the user equipment, so that the user equipment stops measuring in the measurement gap within the duration after transmitting data through the channel according to the priority indicated by the indication information when the channel overlaps with the measurement gap.

In one embodiment, a method for data transmission according to an embodiment of the application includes:

receiving, by a user equipment, indication information configured by a network device to indicate a priority of a channel corresponding to a measurement gap;

transmitting, by the user equipment, data through the channel when the channel overlaps with the measurement gap and when determining that a priority of the channel is higher than a priority of the measurement gap according to the indication information.

In one embodiment, receiving, by the user equipment, indication information configured by a network device to indicate a priority of a channel corresponding to a measurement gap, includes: receiving, by the user equipment, the indication information configured by the network device through RRC signaling; or receiving, by the user equipment, the indication information configured by the network device through physical layer signaling; or determining, by the user equipment, the indication information from received configuration information of a logical channel transmitted by the network device.

In one embodiment, when the user equipment receives the indication information configured by the network device through RRC signaling, the indication information is a parameter of the configured grant or the priority information of PUCCH transmission.

In one embodiment, when the priority information of the PUCCH transmission is priority information of a CSI report, the indication information is used to indicate a priority of a channel corresponding to the CSI corresponding to the measurement gap; or when the priority information of the PUCCH transmission is priority information of an SR, the indication information is used to indicate a priority of a channel carrying the SR corresponding to the measurement gap; or when the priority information of the PUCCH transmission is priority information of an HARQ feedback, the indication information is used to indicate a priority of a channel carrying the HARQ feedback corresponding to the measurement gap.

In one embodiment, the priority information of the PUCCH transmission is the priority information of the SR; and receiving, by the user equipment, the indication information configured by the network device through RRC signaling, includes: receiving, by the user equipment, SR configuration information transmitted by the network device through RRC signaling, and determining the priority information of the SR from the SR configuration information.

In one embodiment, the indication information is used to indicate a priority of one of a PDSCH, a PUSCH and a PUCCH corresponding to the measurement gap.

In one embodiment, when the user equipment receives the indication information through RRC signaling or receives the indication information through physical layer signaling, the user equipment determines the priority of the channel corresponding to the measurement gap according to a value of priority information or flag.

In one embodiment, when the user equipment determines the indication information from the configuration information of the logical channel, the indication information is used to indicate a priority of a PUSCH corresponding to the measurement gap or indicate a priority of a PUCCH corresponding to the measurement gap.

In one embodiment, when the user equipment determines the indication information through the configuration information of the logical channel, the user equipment determines the priority of the channel corresponding to the measurement gap by a part or all of: when the indication information includes priority, the user equipment determines the priority of the channel corresponding to the measurement gap through a value of priority; when the indication information includes flag, the user equipment determines the priority of the channel corresponding to the measurement gap through a value of flag; when the indication information includes a maximum duration of a PUSCH configured for the logical channel, the user equipment determines whether the maximum duration of the PUSCH corresponding to the logical channel is lower than a first threshold, and if so, determines that the priority of the channel is higher than the priority of the measurement gap; when the indication information includes an SCS configured for the logical channel, the user equipment determines whether the SCS configured for the logical channel is higher than a second threshold, and if so, determines that the priority of the channel is higher than the priority of the measurement gap; when the indication information includes information for indicating whether the logical channel allows the use of pre-configured grant, the user equipment determines whether the logical channel allows the use of pre-configured grant, and if so, determines that the priority of the channel is higher than the priority of the measurement gap; when the indication information includes information for indicating whether the logical channel allows repeated transmission, the user equipment determines whether the logical channel allows repeated transmission, and if so, determines that the priority of the channel is higher than the priority of the measurement gap.

In one embodiment, the logical channel is a logical channel used for triggering SR configuration.

In one embodiment, the method further includes: determining, by the user equipment, a duration configured by the network device; and stopping, by the user equipment, measuring in the measurement gap within the duration after transmitting data through the channel according to the priority indicated by the indication information when the channel overlaps with the measurement gap.

In one embodiment, a network device for information configuration according to an embodiment of the application includes: a processor, a memory and a transceiver; and the processor is configured to read a program in the memory and perform the steps of any of the methods described in the embodiments.

In one embodiment, a user equipment for data transmission according to an embodiment of the application includes: a processor, a memory and a transceiver; and the processor is configured to read a program in the memory and perform the steps of any of the methods described in the embodiments.

In one embodiment of the application further provides a computer storage medium storing a computer program thereon, where the program, when executed by a processor, implements the steps of any method in direct communication.

Furthermore, the embodiments brought about by any implementation in the embodiments can refer to the embodiments brought about by different implementations in the embodiments, and will not be repeated here.

BRIEF DESCRIPTION OF THE DRAWINGS

In order to illustrate the embodiments of the application more clearly, the accompanying figures which need to be used in describing the embodiments will be introduced below briefly. The accompanying figures described below are only some embodiments of the application, and other accompanying figures can also be obtained according to these accompanying figures.

FIG. 8 is a schematic flowchart of a method for information configuration according to an embodiment of the application; and FIG. 9 is a schematic flowchart of a method for data transmission according to an embodiment of the application.

6

DETAILED DESCRIPTION

Some words that appear herein will be explained below.
1. "and/or" describes the association relationship of the associated objects, and indicates that there may be three relationships, for example, A and/or B may represent: only A, both A and B, and only B. The character "/" generally indicates that the associated objects have a kind of "or" relationship.
2. "flag" provided in the embodiments of the application is bool (Boolean)-type data, and used as a mark indicating the priority in the embodiments of the application.
3. "Priority" provided in the embodiments of the application is integer-type data, and used as a mark indicating the level of priority in the embodiments of the application. Generally, the larger the value, the lower the priority.

The application scenarios described in the embodiments of the application are intended to illustrate the embodiments of the application more clearly, and do not constitute a limitation on the embodiments of the application. In one embodiment, with the appearance of new application scenarios, the embodiments of the application are also applicable to similar problems. Here, in the description of the application, "multiple" means two or more unless otherwise specified.

When the user equipment performs a measurement, when the center frequency of the current cell and the center frequency of the target cell are the same, it is the intra-frequency measurement; when the center frequency of the current cell and the center frequency of the target cell are different, it is the inter-frequency measurement. When the user equipment performs the inter-frequency measurement, if the data transmission overlaps with the measurement gap, the UE will perform the measurement, and the uplink data transmission and downlink data reception need to be delayed until the measurement is completed.

Figure 1:
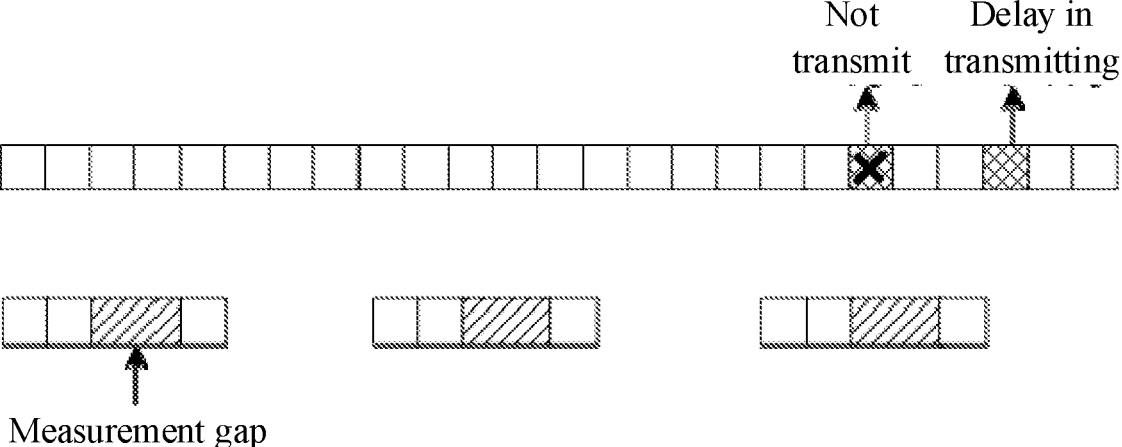
FIG. 1 is a schematic diagram of a scenario of measurement gap according to an embodiment of the application.

As shown in FIG. 1, it is a schematic diagram of the time overlap of data transmission and measurement gap on the UE side.

The data transmission request of the UE may be the UL (Uplink) data including data information and control information), and the transmission may also be the DL (Downlink) data including data information and control information reception. For example, the UE no longer performs HARQ, CSI and SR reporting, data transmission and reception, etc. during the measurement gap.

The overlap of data transmission with measurement gap can be understood as the overlap of the channel carrying the data with the measurement gap in time, that is, time overlap. The time overlap may be subframe overlap, slot overlap, or symbol overlap. The overlap can be understood as partial overlap or full overlap.

The increase in transmission delay caused by the measurement gap can be ignored for users with low delay requirement. But, for the relatively strict delay requirement, for example, the 5G technology proposes an important test scenario—URLLC (Ultra Reliable Low Latency Communications) scenario, which is suitable for industrial application and control, traffic safety and control, remote manufacturing, remote train, and remote surgery. This scenario requires the end-to-end latency to reach 0.5 ms (milliseconds). The transmission delay caused by the measurement gap may cause the above scenario to fail to meet the delay requirement.

Therefore, an embodiment of the application proposes a data transmission method to solve the transmission delay caused by the measurement gap. The network device configures the indication information of the priority of the channel corresponding to the measurement gap for the user equipment, and the user equipment receives the indication information and performs the configuration according to the indication information. If the measurement gap overlaps with the channel for data transmission, the user equipment determines whether to continue the measurement or to transmit data through the channel according to the priority indicated by the indication information. For scenarios with high delay requirement, the network side can configure the higher priority of the channel corresponding to the measurement gap for the user equipment. If they overlap, the user equipment can continue transmitting the data, avoiding the transmission delay caused by the measurement gap.

The embodiments of the application will be further described in detail below in combination with the accompanying drawings of the specification.

Figure 2:
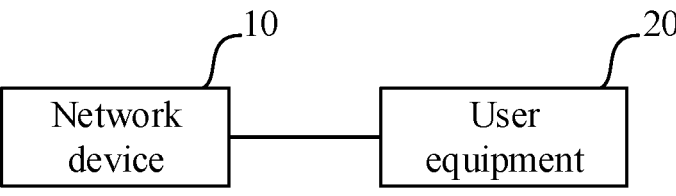
FIG. 2 is a schematic structural diagram of a system for information configuration and data transmission according to an embodiment of the application.

As shown in FIG. 2, an embodiment of the application provides a system for information configuration and data transmission. The system includes: a network device 10 and a user equipment 20.

The network device 10 is configured to: determine the indication information for indicating the priority of a channel corresponding to a measurement gap; and configure the indication information for a user equipment, so that the user equipment determines whether to transmit data through the channel according to the priority indicated by the indication information when the channel overlaps with the measurement gap.

The user equipment 20 is configured to receive the indication information configured by the network device for indicating the priority of the channel corresponding to the measurement gap; and when the channel overlaps with the measurement gap, transmit data through the channel when determining that the priority of the channel is higher than the priority of the measurement gap according to the indication information.

Through the above method, the network device configures the indication information of the priority of the channel corresponding to the measurement gap for the user equipment, and the user equipment receives the indication information and performs the configuration according to the indication information. If the measurement gap overlaps with the channel for data transmission, the user equipment determines whether to continue the measurement or to transmit data through the channel according to the priority indicated by the indication information. For scenarios with high delay requirement, the network side can configure the higher priority of the channel corresponding to the measurement gap for the user equipment. If they overlap, the user equipment can continue transmitting the data, avoiding the transmission delay caused by the measurement gap and reducing the transmission delay.

In the embodiments of the application, the network device can configure the indication information for the user equipment in various ways, such as: configure the indication information through RRC signaling; or configure the indication information through physical layer signaling; or configure the indication information for the user equipment through the configuration information of a logical channel. The indication information is used to indicate the priority of an uplink channel or a downlink channel corresponding to the measurement gap.

The configuration modes will be illustrated below by way of examples.

Configuration mode 1: configure through RRC signaling.

During the configuration through RRC signaling, the network device may determine a parameter of configured grant as the indication information or may determine the priority information of the PUCCH transmission as the indication information, to indicate the priority of one of PDSCH, PUSCH and PUCCH corresponding to the measurement gap. The configuration modes will be introduced and explained below by way of embodiments.

First Embodiment

Determine a parameter of configured grant as the indication information.

The network device configures the configured grant through RRC signaling, and determines the parameter of the configured grant as the indication information. There are many configuration modes in which the parameter of the configured grant is determined as the indication information, which will be illustrated below by way of examples.

Indication mode 1: determine the priority parameter of the configured grant as the indication information.

When the priority parameter is lower than a pre-configured threshold, which indicates that the channel has a higher priority than the measurement gap, the user equipment performs the channel transmission at the overlapping position when the channel overlaps with the measurement gap; when the priority parameter is not lower than the pre-configured threshold, which indicates the channel has a lower priority than the measurement gap, the user equipment performs the measurement at the overlapping position when the channel overlaps with the measurement gap.

For example, the pre-configured threshold is 10, and when the priority parameter is lower than 10, the channel has a higher priority than the measurement gap.

Indication mode 2: determine the flag parameter of the configured grant as the indication information.

The priorities of the channel and the measurement gap are distinguished according to the value of the flag parameter.

When the value of the flag parameter is 1, which indicates that the channel has a higher priority than the measurement gap, the user equipment performs the channel transmission at the overlapping position when the channel overlaps with the measurement gap; when the value of the flag parameter is 0, which indicates the channel has a lower priority than the measurement gap, the user equipment performs the measurement at the overlapping position when the channel overlaps with the measurement gap.

It should be noted that the above parameters are only examples. In the embodiments of the application, the priority can be determined through the value of the parameter of the configured grant, or the priority can be determined through the existence of the parameter itself. For example, if the flag parameter exists, it means that the channel has a higher priority than the measurement gap; if the flag parameter does not exist, it means that the channel has a lower priority than the measurement gap.

The network device transmits the configuration information of the configured grant including the parameter indicating the priority to the user equipment, and the user equipment configures according to the configuration information. When transmitting the data in the UL grant configured by the configured grant, the user equipment determines whether the PUSCH channel carrying the data overlaps with the measurement gap; and if so, determines whether to transmit the data through the PUSCH channel according to the priority indicated by the indication information. The determination method refers to the indication methods described above, which will not be repeated here.

Second Embodiment

Determine the priority information of the PUCCH transmission as indication information.

The PUCCH channel is an uplink common control channel, and used for HARQ feedback, CSI feedback, SR scheduling request, etc. Therefore, the priority information of the PUCCH transmission may be the priority information of the HARQ feedback, which is used to indicate the priority of the channel carrying the HARQ feedback corresponding to the measurement gap; or the priority information of the PUCCH transmission is the priority information of the SR, which is used to indicate the priority of the channel carrying the SR corresponding to the measurement gap; or the priority information of the PUCCH transmission is the priority information of the CSI feedback, which is used to indicate the priority of the channel corresponding to the CSI corresponding to the measurement gap.

As an example, the priority information of the PUCCH transmission is the priority information of the SR, and the modes in which the network device configures the indication information of the priority information of the SR will be illustrated by way of example.

Indication mode 1: determine the priority parameter of the SR as the indication information.

Indication mode 2: determine the flag parameter of the SR as the indication information.

The indication modes 1 and 2 can refer to the steps of determining the parameter of the configured grant as the indication information, which will not be repeated here.

Indication mode 3: determine a parameter of the SR configuration as the indication information.

An embodiment of the application also provides a possible mode in which the network device configures the parameter of the SR configuration. The SR configuration process will be illustrated below.

It is assumed that there is a UE, and the network device is an eNodeB (evolved Node B). If the UE has no uplink data to be transmitted, the eNodeB does not need to allocate uplink resources for the UE; otherwise, this will cause the waste of resources. Therefore, the UE needs to tell the eNodeB whether it has uplink data to be transmitted, so that the eNodeB can decide whether to allocate uplink resources to the UE. To this end, the LTE provides an uplink Scheduling Request (SR) mechanism.

The eNodeB can allocate a dedicated SR resource for each UE to transmit an SR, and it will be used only when the UE has uplink data to be transmitted but no uplink resource. The UE transmits the SR on the SR resource, where the SR is used to request the eNodeB to allocate uplink resources, and the SR resource is periodic and appears once every n subframes. In addition, the UE transmits the SR due to no uplink PUSCH resource, so the UE can only transmit the SR on the PUCCH.

The parameters of the SR configuration include some or all of the followings.

1. SR resource location.

Since the SR resources are dedicated to the UE and allocated by the eNodeB, one UE may correspond to multiple SR resources, but each SR resource corresponds to one UE and the eNodeB knows the specific correspondence. That is, when transmitting the SR information, a UE does not need to specify its own ID (C-RNTI (Cell Radio Network Temporary Identifier)). The eNodeB can determine which UE requests uplink resources through the location of the SR resource and the codeword information of the SR. For example, the UE1 transmits an SR on the resources of PUCCH format 1. The SR resources are represented by (PUCCH1, SR1), so the eNodeB can determine that the UE1 requests uplink resources through [(PUCCH format 1), (PUCCH1, SR1)].

2. SR cycle.

3. Offset transmitted by SR.

In the embodiments of the application, the parameters of the SR configuration can be used as the indication information through the network device. For example, the priority parameter or the flag parameter is added to the SR configuration, and the priority parameter or the flag parameter in the SR configuration indicates the priority of the channel carrying the SR that needs to be reported corresponding to the measurement gap.

The network device transmits the configuration information of the SR configuration to the user equipment, and the user equipment configures according to the configuration information. If the PUCCH of the SR configuration overlaps with the measurement gap, the user equipment determines whether to report the SR through the PUCCH channel according to the priority indicated by the indication information.

Configuration mode 2: configure through physical layer signaling.

The network device configures the indication information for the user equipment through the physical layer signaling, and determines the parameters included in the physical layer signaling as the indication information to indicate the priority of the PUCCH or PUSCH or PDSCH corresponding to the measurement gap. Different cases of configuring the above priority information of the channel corresponding to the measurement gap will be introduced and illustrated below.

Third Embodiment

The network device configures the indication information of the priority of the PUSCH corresponding to the measurement gap through the physical layer signaling. The possible configuration modes for the indication information will be introduced and illustrated below.

Indication mode 1: determine the parameters included in the DCI signaling for activating the configured grant 2 as the indication information.

For example, the priority parameter or flag parameter in the DCI signaling is determined as the indication information. When transmitting the data in the UL grant of the configured grant 2, the user equipment determines whether the PUSCH channel carrying the data overlaps with the measurement gap, and if so, determines whether to transmit the data through the PUSCH channel according to the priority indicated by the indication information.

Indication mode 2: determine the parameters included in the DCI signaling for dynamic scheduling of PUSCH transmission as indication information.

In one embodiment, the configuration steps of determining the parameters of the DCI signaling as the indication information can refer to the above embodiments, and will not be repeated here.

The network device transmits the configuration information of the DCI signaling to the user equipment, and the user equipment configures according to the configuration information. If there is an overlap with the measurement gap, it is determined whether to transmit data through the PUSCH channel according to the indication information in the indication mode 1 or indication mode 2. If it is determined that the PUSCH has a higher priority than the measurement gap, the PUSCH transmission is performed at the overlapping position; otherwise, the measurement is performed at the overlapping position.

Fourth Embodiment

The network device configures the indication information of the priority of the PUCCH corresponding to the measurement gap through physical layer signaling.

The network device determines the parameters included in the DCI signaling that triggers the aperiodic reporting of the CSI as the indication information.

For example, the network device determines the priority parameter or the flag parameter in the DCI signaling that triggers the aperiodic reporting of the CSI as the indication information, and transmits the configuration information for configuring the DCI signaling to the user equipment; and the user equipment configures according to the configuration information. When there is an overlap with the measurement gap when the user equipment reports the CSI through the PUCCH, the user equipment determines the priority of the PUCCH channel carrying the CSI corresponding to the measurement gap according to the value of the flag parameter in the DCI signaling. If the value of the flag parameter indicates that the PUCCH channel has a higher priority, the CSI reporting is performed at the overlapping position, that is, the CSI is reported through the PUCCH channel.

Fifth Embodiment

The network device configures the indication information of the priority of the PDSCH corresponding to the measurement gap through physical layer signaling.

The network device determines the parameters included in the DCI signaling for the dynamic scheduling of the PDSCH as the indication information.

For example, the priority parameter or the flag parameter in the DCI signaling for the dynamic scheduling of the PDSCH is determined as the indication information. When the data carried by the PDSCH received by the user equipment overlaps with the measurement gap, the user equipment determines the priority of the PUCCH channel carrying the CSI corresponding to the measurement gap according to the value of the flag parameter in the DCI signaling. If the value of the flag parameter indicates that the PDSCH channel has a higher priority, the downlink data is received at the overlapping position, that is, the data carried by the PDSCH channel is received.

It should be noted that the configuration steps of determining the parameters of the DCI signaling as the indication information in each embodiment of the user equipment in the configuration mode 2 may refer to the embodiments in the configuration mode 1, which will not be repeated here.

Configuration mode 3: configure through the configuration information of a logical channel.

The logical channel in the embodiment of the application is a logical channel used for triggering the SR configuration. The network device determines the priority information of the logical channel as the indication information to indicate the priority of the PUCCH or PUSCH or PDSCH corresponding to the measurement gap. The configuration modes for the indication information will be illustrated below by way of examples.

Indication mode 1: determine the priority parameter of the logical channel as the indication information.

Indication mode 2: determine the flag parameter of the logical channel as the indication information.

Indication mode 3: determine the maximum duration of the PUSCH corresponding to the logical channel as the indication information.

It is determined whether the maximum duration of the PUSCH corresponding to the logical channel is lower than a first threshold; if so, it is determined that the PUSCH corresponding to the logical channel has a higher priority than the measurement gap, and the PUSCH transmission is performed at the overlapping position when the PUSCH transmission overlaps with the measurement gap; otherwise, it is determined that the PUSCH corresponding to the logical channel has a lower priority than the measurement gap, and the measurement is performed at the overlapping position when the PUSCH transmission overlaps with the measurement gap.

For example, the first threshold is 0.5 ms. When the maximum duration of the PUSCH is less than 0.5 ms, it is determined that the PUSCH has a higher priority than the measurement gap; otherwise, it is determined that the PUSCH has a lower priority than the measurement gap.

Indication mode 4: determine the SCS (Subcarrier space) configured for the logical channel as the indication information.

It is determined whether the SCS configured for the logical channel is higher than a second threshold; if so, it is determined that the PUSCH corresponding to the logical channel has a higher priority than the measurement gap, and the PUSCH transmission is performed at the overlapping position when the PUSCH transmission overlaps with the measurement gap; otherwise, it is determined that the PUSCH corresponding to the logical channel has a lower priority than the measurement gap, and the measurement is performed at the overlapping position when the PUSCH transmission overlaps with the measurement gap.

For example, the second threshold is 30 KHz. When the SCS is higher than 30 KHz, it is determined that the PUSCH has a higher priority than the measurement gap; otherwise, it is determined that the PUSCH has a lower priority than the measurement gap.

It should be noted that the first threshold value and the second threshold in the embodiments of the application may be configured by the network device, or may be pre-configured values.

Indication mode 5: determine the information indicating whether the logical channel allows the use of pre-configured grant as the indication information.

If the logical channel allows the use of pre-configured grant, it is determined that the PUSCH corresponding to the logical channel has a higher priority than the measurement gap, and the PUSCH transmission is performed at the overlapping position when the PUSCH transmission overlaps with the measurement gap; otherwise, it is determined that the PUSCH corresponding to the logical channel has a lower priority than the measurement gap, and the measurement is performed at the overlapping position when the PUSCH transmission overlaps with the measurement gap.

Indication mode 6: determine the information indicating whether the logical channel allows the repeated transmission as the indication information.

If the logical channel allows the repeated transmission, it is determined that the PUSCH corresponding to the logical channel has a higher priority than the measurement gap, and the PUSCH transmission is performed at the overlapping position when the PUSCH transmission overlaps with the measurement gap; otherwise, it is determined that the PUSCH corresponding to the logical channel has a lower priority than the measurement gap, and the measurement is performed at the overlapping position when the PUSCH transmission overlaps with the measurement gap.

The network device transmits the configuration information of the logical channel to the user equipment, and the user equipment configures according to the configuration information. When the PUSCH transmission overlaps with the measurement gap, the user equipment determines the priority of the PUSCH in one of the six indication modes described above. If it is determined that the PUSCH has a higher priority than the measurement gap, then the PUSCH transmission is performed at the overlapping position; otherwise, the measurement is performed at the overlapping position.

In an embodiment of the application, if the measurement is performed at the overlapping position, the PUSCH or PUCCH or PDSCH transmission is performed after the measurement is completed; if the PUSCH, PUCCH or PDSCH transmission is performed at the overlapping position, the user equipment does not perform the measurement in the current measurement gap. If there is no overlap with the measurement gap in the next measurement cycle, the measurement is performed. Further, an embodiment of the application further provides a way to stop the measurement, where the network device configures a duration for the user equipment so that the user equipment stops the measurement gap within the duration after transmitting the data through the channel according to the priority indicated by the indication information after the channel overlaps with the measurement gap until the timing is completed. That is illustrated below by way of example.

Sixth Embodiment

The user equipment stops the measurement within the configured duration.

With reference to the first embodiment, the network device configures the indication information indicating the priority of the channel corresponding to the measurement gap and the duration of stopping the measurement for the user equipment through RRC signaling, and transmits the configuration information to the user equipment. The user equipment configures according to the configuration information. When the user equipment has a data transmission service, for example, the user equipment transmits the data through the PUSCH, if the PUSCH overlaps with the measurement gap, the user equipment determines whether it can continue transmitting the data through the PUSCH according to the indication information. If it is determined according to the indication information that the PUSCH has a higher priority than the measurement gap, the user equipment performs the PUSCH transmission at the overlapping position and starts a timer while performing the PUSCH transmission. The timing duration of the timer is the duration configured by the network device to stop the measurement. Within this duration, the user equipment will no longer perform the measurement even if the PUSCH transmission has been completed or the PUSCH transmission no longer overlaps with the measurement gap.

Figure 3:
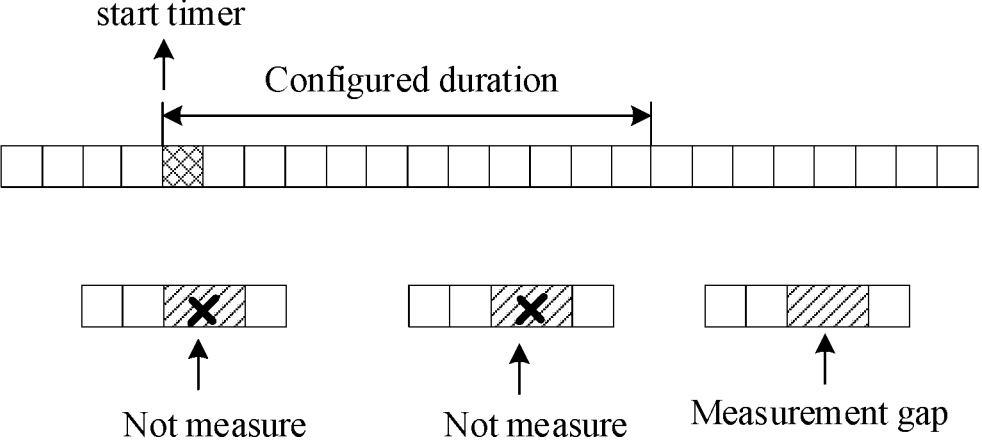
FIG. 3 is a schematic diagram of a scenario in which the measurement is stopped according to the configured duration according to an embodiment of the application.

For example, as shown in FIG. 3, the user equipment stops the measurement within the duration after transmitting the data through the channel according to the priority indicated by the indication information when the channel overlaps with the measurement gap.

If the measurement gap overlaps with the channel, when the user equipment determines that the channel has a higher priority than the measurement gap, the user equipment transmits the data through the channel at the overlapping position and starts a timer at the same time. When the timing time is within the configured duration, the user equipment does not perform the measurement in the measurement gap until the timing time reaches the configured duration, and the user equipment performs the measurement again when determining that the measurement gap no longer overlaps with the channel or determining that the channel has a lower priority than the measurement gap.

Based on the same inventive concept, an embodiment of the application further provides a network device for information configuration. Since this device is the network device in a system for information configuration and data transmission of the embodiments of the application and the principle solving the problem of this device is similar to that of the method, the implementations of this device can refer to the implementations of the method, and the repeated description thereof will be omitted here.

Figure 4:
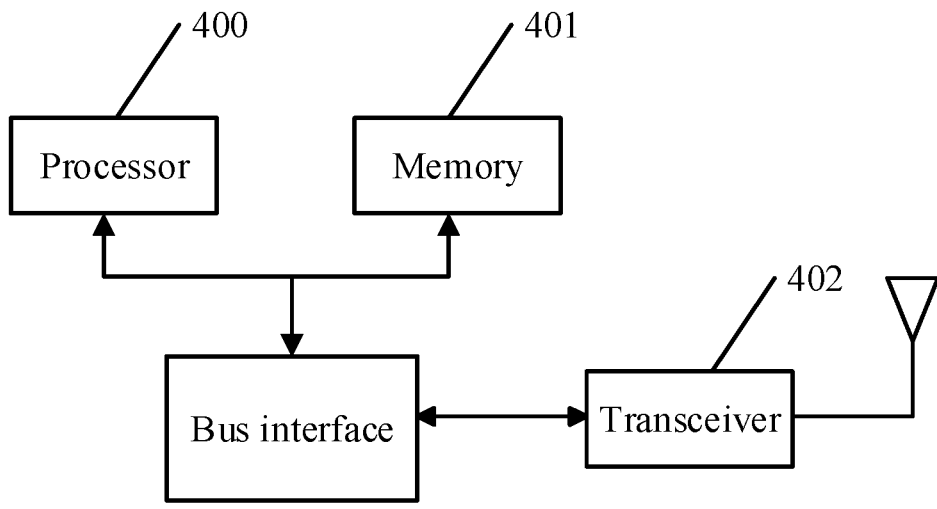
FIG. 4 is a schematic structural diagram of a first network device for information configuration according to an embodiment of the application.

As shown in FIG. 4, a first network device for information configuration in an embodiment of the application includes a processor 400, a memory 401 and a transceiver 402.

The processor 400 is responsible for managing the bus architecture and general processing, and the memory 401 may store the data used by the processor 400 when performing the operations. The transceiver 402 is configured to receive and transmit the data under the control of the processor 400.

The bus architecture may include any numbers of interconnected buses and bridges, and specifically link various circuits of one or more processors represented by the processor 400 and the memory represented by the memory 401. The bus architecture may further link various other circuits such as peripheral device, voltage regulator and power management circuit, which are all well known in the art and thus will not be further described again herein. The bus interface provides an interface. The processor 400 is responsible for managing the bus architecture and general processing, and the memory 401 may store the data used by the processor 400 when performing the operations.

The procedure disclosed by the embodiment of the application may be applied in the processor 400 or implemented by the processor 400. In the implementation process, each step of the signal processing flow may be completed by the integrated logic circuit of hardware in the processor 400 or the instruction in the form of software. The processor 400 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the application. The general-purpose processor may be a microprocessor or any conventional processor or the like. The steps of the method disclosed in combination with the embodiments of the application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 401, and the processor 400 reads the information in the memory 401 and completes the steps of the signal processing flow in combination with its hardware.

In one embodiment, the processor 400 is configured to read the program in the memory 401 and perform:

determine the indication information for indicating the priority of a channel corresponding to a measurement gap; and configure the indication information for a user equipment, so that the user equipment determines whether to transmit data through the channel according to the priority indicated by the indication information when the channel overlaps with the measurement gap.

In one embodiment, the processor 400 is further configured to: configure the indication information for the user equipment through RRC signaling; or configure the indication information for the user equipment through physical layer signaling; or configure the indication information for the user equipment through the configuration information of a logical channel.

In one embodiment, when the indication information is configured for the user equipment through RRC signaling, the processor is configured to: determine a parameter of configured grant as the indication information; or determine the priority information of PUCCH transmission as the indication information.

In one embodiment, when the priority information of the PUCCH transmission is the priority information of a CSI report, the indication information is used to indicate the priority of a channel corresponding to the CSI corresponding to the measurement gap; or when the priority information of the PUCCH transmission is the priority information of an SR, the indication information is used to indicate the priority of a channel carrying the SR corresponding to the measurement gap; or when the priority information of the PUCCH transmission is the priority information of an HARQ feedback, the indication information is used to indicate the priority of a channel carrying the HARQ feedback corresponding to the measurement gap.

In one embodiment, the processor 400 is configured to: when the priority information of the PUCCH transmission is the priority information of the SR, transmit the SR configuration information to the user equipment through RRC signaling, and the SR configuration information includes priority information of the SR.

In one embodiment, the indication information is used to indicate the priority of one of a PDSCH, a PUSCH and a PUCCH corresponding to the measurement gap.

In one embodiment, the processor 400 is configured to: when the indication information is configured for the user equipment through RRC signaling or the indication information is configured for the user equipment through physical layer signaling, indicate the priority of the channel corresponding to the measurement gap by setting a value of priority or flag.

In one embodiment, when the processor 400 configures the indication information for the user equipment through the configuration information of the logical channel, the indication information is used to indicate the priority of a PUSCH corresponding to the measurement gap or indicate the priority of a PUCCH corresponding to the measurement gap.

In one embodiment, when the processor 400 configures the indication information for the user equipment through the configuration information of the logical channel, the indication information is a part or all of:

the priority information;

the flag;

the maximum duration of a PUSCH configured for the logical channel;

an SCS configured for the logical channel;

the information for indicating whether the logical channel allows the use of pre-configured grant;

the information for indicating whether the logical channel allows repeated transmission.

In one embodiment, the logical channel is a logical channel used for triggering SR configuration.

In one embodiment, the processor 400 is further configured to: configure a duration for the user equipment, so that the user equipment stops measuring in the measurement gap within the duration after transmitting data through the channel according to the priority indicated by the indication information when the channel overlaps with the measurement gap.

Figure 5:
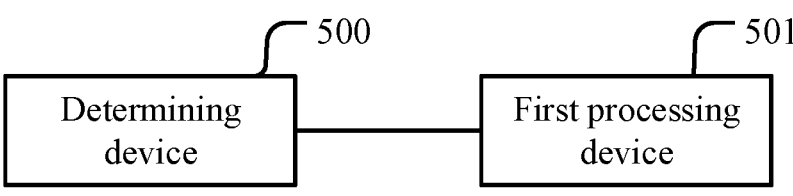
FIG. 5 is a schematic structural diagram of a second network device for information configuration according to an embodiment of the application.

Based on the same idea, as shown in FIG. 5, an embodiment of the application provides a schematic structural diagram of another network device for information configuration. The device includes a determining device 500 and a first processing device 501:

the determining device 500 is configured to determine the indication information for indicating the priority of a channel corresponding to a measurement gap;

the first processing device 501 is configured to configure the indication information for a user equipment, so that the user equipment determines whether to transmit data through the channel according to the priority indicated by the indication information when the channel overlaps with the measurement gap.

In one embodiment, the first processing device 501 is further configured to: configure the indication information for the user equipment through RRC signaling; or configure the indication information for the user equipment through physical layer signaling; or configure the indication information for the user equipment through the configuration information of a logical channel.

In one embodiment, when the indication information is configured for the user equipment through RRC signaling, the first processing device 501 is configured to: determine a parameter of configured grant as the indication information; or determine the priority information of PUCCH transmission as the indication information.

In one embodiment, when the priority information of the PUCCH transmission is the priority information of a CSI report, the indication information is used to indicate the priority of a channel corresponding to the CSI corresponding to the measurement gap; or when the priority information of the PUCCH transmission is the priority information of an SR, the indication information is used to indicate the priority of a channel carrying the SR corresponding to the measurement gap; or when the priority information of the PUCCH transmission is the priority information of an HARQ feedback, the indication information is used to indicate the priority of a channel carrying the HARQ feedback corresponding to the measurement gap.

In one embodiment, the first processing device 501 is configured to: when the priority information of the PUCCH transmission is the priority information of the SR, transmit the SR configuration information to the user equipment through RRC signaling, and the SR configuration information includes the priority information of the SR.

In one embodiment, the indication information is used to indicate the priority of one of a PDSCH, a PUSCH and a PUCCH corresponding to the measurement gap.

In one embodiment, the first processing device 501 is configured to: when the indication information is configured for the user equipment through RRC signaling or the indication information is configured for the user equipment through physical layer signaling, indicate the priority of the channel corresponding to the measurement gap by setting a value of priority or flag.

In one embodiment, when the first processing device 501 configures the indication information for the user equipment through the configuration information of the logical channel, the indication information is used to indicate the priority of a PUSCH corresponding to the measurement gap or indicate the priority of a PUCCH corresponding to the measurement gap.

In one embodiment, when the first processing device 501 configures the indication information for the user equipment through the configuration information of the logical channel, the indication information is a part or all of:

the priority information;

the flag;

the maximum duration of a PUSCH configured for the logical channel;

an SCS configured for the logical channel;

the information for indicating whether the logical channel allows the use of pre-configured grant;

the information for indicating whether the logical channel allows repeated transmission.

In one embodiment, the logical channel is a logical channel used for triggering SR configuration.

In one embodiment, the first processing device 501 is further configured to: configure a duration for the user equipment, so that the user equipment stops measuring in the measurement gap within the duration after transmitting data through the channel according to the priority indicated by the indication information when the channel overlaps with the measurement gap.

Based on the same inventive concept, an embodiment of the application further provides a user equipment for data transmission. Since this device is the user equipment in a system for information configuration and data transmission of the embodiments of the application and the principle solving the problem of this device is similar to that of the method, the implementations of this device can refer to the implementations of the method, and the repeated description thereof will be omitted here.

Figure 6:
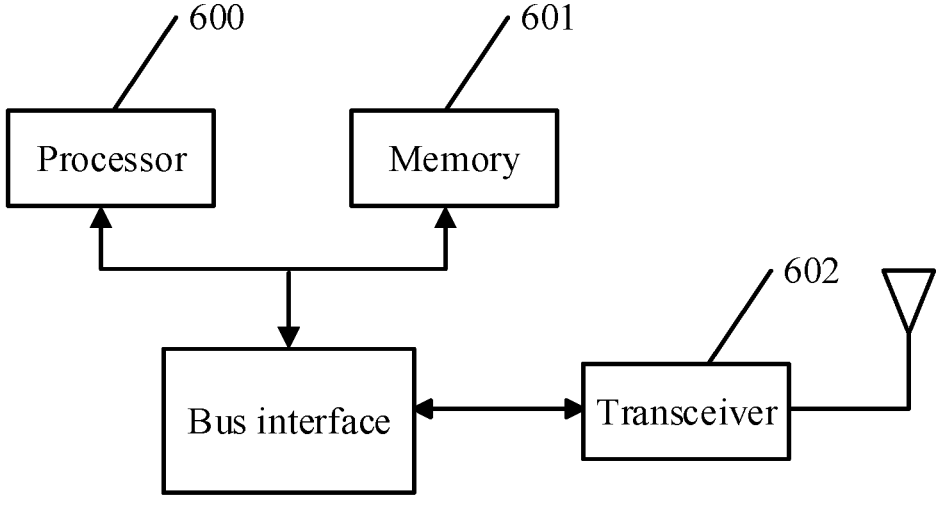
FIG. 6 is a schematic structural diagram of a first user equipment for data transmission according to an embodiment of the application.

As shown in FIG. 6, a user equipment for data transmission in an embodiment of the application includes a processor 600, a memory 601 and a transceiver 602.

The processor 600 is responsible for managing the bus architecture and general processing, and the memory 601 may store the data used by the processor 600 when performing the operations. The transceiver 602 is configured to receive and transmit the data under the control of the processor 600.

The bus architecture may include any numbers of interconnected buses and bridges, and specifically link various circuits of one or more processors represented by the processor 600 and the memory represented by the memory 601. The bus architecture may further link various other circuits such as peripheral device, voltage regulator and power management circuit, which are all well known in the art and thus will not be further described again herein. The bus interface provides an interface. The processor 600 is responsible for managing the bus architecture and general processing, and the memory 601 may store the data used by the processor 600 when performing the operations.

The procedure disclosed by the embodiment of the application may be applied in the processor 600 or implemented by the processor 600. In the implementation process, each step of the signal processing flow may be completed by the integrated logic circuit of hardware in the processor 600 or the instruction in the form of software. The processor 600 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in the embodiments of the application. The general-purpose processor may be a microprocessor or any conventional processor or the like. The steps of the method disclosed in combination with the embodiments of the application may be directly completed by a hardware processor, or completed by a combination of hardware and software devices in the processor. The software devices may be located in the random access memory, flash memory, read only memory, programmable read only memory or electrically erasable programmable read only memory, register and other mature storage medium in the art. The storage medium is located in the memory 601, and the processor 600 reads the information in the memory 601 and completes the steps of the signal processing flow in combination with its hardware.

In one embodiment, the processor 600 is configured to read the program in the memory 601 and perform:

receive the indication information configured by a network device to indicate the priority of a channel corresponding to a measurement gap; and transmit data through the channel when the channel overlaps with the measurement gap and when determining that the priority of the channel is higher than the priority of the measurement gap according to the indication information.

In one embodiment, the processor 600 is configured to: receive the indication information configured by the network device through RRC signaling; or receive the indication information configured by the network device through physical layer signaling; or determine the indication information from the received configuration information of a logical channel transmitted by the network device.

In one embodiment, the processor 600 is configured to: when the indication information configured by the network device is received through RRC signaling, the indication information is a parameter of the configured grant or the priority information of PUCCH transmission.

In one embodiment, when the priority information of the PUCCH transmission is the priority information of a CSI report, the indication information is used to indicate the priority of a channel corresponding to the CSI corresponding to the measurement gap; or when the priority information of the PUCCH transmission is the priority information of an SR, the indication information is used to indicate the priority of a channel carrying the SR corresponding to the measurement gap; or when the priority information of the PUCCH transmission is the priority information of an HARQ feedback, the indication information is used to indicate the priority of a channel carrying the HARQ feedback corresponding to the measurement gap.

In one embodiment, the processor 600 is configured to: when the priority information of the PUCCH transmission is the priority information of the SR, receive the SR configuration information transmitted by the network device through RRC signaling, and determine the priority information of the SR from the SR configuration information.

In one embodiment, the indication information is used to indicate the priority of one of a PDSCH, a PUSCH and a PUCCH corresponding to the measurement gap.

In one embodiment, the processor 600 is configured to: when the indication information is received through RRC signaling or the indication information is received through physical layer signaling, determine the priority of the channel corresponding to the measurement gap according to a value of priority information or flag.

In one embodiment, when the processor 600 determines the indication information from the configuration information of the logical channel, the indication information is used to indicate the priority of a PUSCH corresponding to the measurement gap or indicate the priority of a PUCCH corresponding to the measurement gap.

Optionally, the processor 600 is configured to:
when the indication information is determined through the configuration information of the logical channel, determine the priority of the channel corresponding to the measurement gap by a part or all of:
when the indication information includes priority, determine the priority of the channel corresponding to the measurement gap through a value of priority;
when the indication information includes flag, determine the priority of the channel corresponding to the measurement gap through a value of flag;
when the indication information includes the maximum duration of a PUSCH configured for the logical channel, determine whether the maximum duration of the PUSCH corresponding to the logical channel is lower than a first threshold, and if so, determine that the priority of the channel is higher than the priority of the measurement gap;
when the indication information includes an SCS configured for the logical channel, determine whether the SCS configured for the logical channel is higher than a second threshold, and if so, determine that the priority of the channel is higher than the priority of the measurement gap;
when the indication information includes information for indicating whether the logical channel allows the use of pre-configured grant, determine whether the logical channel allows the use of pre-configured grant, and if so, determine that the priority of the channel is higher than the priority of the measurement gap;
when the indication information includes information for indicating whether the logical channel allows repeated transmission, determine whether the logical channel allows repeated transmission, and if so, determine that the priority of the channel is higher than the priority of the measurement gap.

In one embodiment, the logical channel is a logical channel used for triggering SR configuration.

In one embodiment, the processor 600 is further configured to: determine a duration configured by the network device; and stop measuring in the measurement gap within the duration after transmitting data through the channel according to the priority indicated by the indication information when the channel overlaps with the measurement gap.

Figure 7:
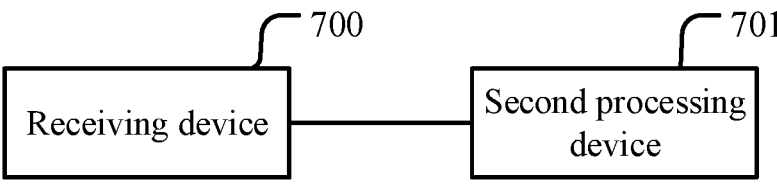
FIG. 7 is a schematic structural diagram of a second user equipment for data transmission according to an embodiment of the application.

Based on the same inventive concept, as shown in FIG. 7, an embodiment of the application provides a schematic structural diagram of another user equipment for data transmission. The user equipment includes: a receiving device 700 and a second processing device 701:

the receiving device 700 is configured to receive the indication information configured by a network device to indicate the priority of a channel corresponding to a measurement gap;
the second processing device 701 is configured to transmit data through the channel when the channel overlaps with the measurement gap and when determining that the priority of the channel is higher than the priority of the measurement gap according to the indication information.

In one embodiment, the second processing device 701 is configured to: receive the indication information configured by the network device through RRC signaling; or receive the indication information configured by the network device through physical layer signaling; or determine the indication information from the received configuration information of a logical channel transmitted by the network device.

In one embodiment, the second processing device 701 is configured to: when the indication information configured by the network device is received through RRC signaling, the indication information is a parameter of the configured grant or the priority information of PUCCH transmission.

In one embodiment, when the priority information of the PUCCH transmission is the priority information reported by a CSI, the indication information is used to indicate the priority of a channel corresponding to the CSI corresponding to the measurement gap; or when the priority information of the PUCCH transmission is the priority information of an SR, the indication information is used to indicate the priority of a channel carrying the SR corresponding to the measurement gap; or when the priority information of the PUCCH transmission is the priority information of an HARQ feedback, the indication information is used to indicate the priority of a channel carrying the HARQ feedback corresponding to the measurement gap.

In one embodiment, the second processing device 701 is configured to: when the priority information of the PUCCH transmission is the priority information of the SR, receive the SR configuration information transmitted by the network device through RRC signaling, and determine the priority information of the SR from the SR configuration information.

In one embodiment, the indication information is used to indicate the priority of one of a PDSCH, a PUSCH and a PUCCH corresponding to the measurement gap.

In one embodiment, the second processing device 701 is configured to: when the indication information is received through RRC signaling or the indication information is received through physical layer signaling, determine the priority of the channel corresponding to the measurement gap according to a value of priority information or flag.

In one embodiment, when the processor determines the indication information from the configuration information of the logical channel, the indication information is used to indicate the priority of a PUSCH corresponding to the measurement gap or indicate the priority of a PUCCH corresponding to the measurement gap.

In one embodiment, the second processing device 701 is configured to:
when the indication information is determined through the configuration information of the logical channel, determine the priority of the channel corresponding to the measurement gap by a part or all of:
when the indication information includes priority, determine the priority of the channel corresponding to the measurement gap through a value of priority;

when the indication information includes flag, determine the priority of the channel corresponding to the measurement gap through a value of flag;

when the indication information includes the maximum duration of a PUSCH configured for the logical channel, determine whether the maximum duration of the PUSCH corresponding to the logical channel is lower than a first threshold, and if so, determine that the priority of the channel is higher than the priority of the measurement gap;

when the indication information includes an SCS configured for the logical channel, determine whether the SCS configured for the logical channel is higher than a second threshold, and if so, determine that the priority of the channel is higher than the priority of the measurement gap;

when the indication information includes information for indicating whether the logical channel allows the use of pre-configured grant, determine whether the logical channel allows the use of pre-configured grant, and if so, determine that the priority of the channel is higher than the priority of the measurement gap;

when the indication information includes information for indicating whether the logical channel allows repeated transmission, determine whether the logical channel allows repeated transmission, and if so, determine that the priority of the channel is higher than the priority of the measurement gap.

In one embodiment, the logical channel is a logical channel used for triggering SR configuration.

In one embodiment, the second processing device 802 is further configured to: determine a duration configured by the network device; and stop measuring in the measurement gap within the duration after transmitting data through the channel according to the priority indicated by the indication information when the channel overlaps with the measurement gap.

Based on the same inventive concept, an embodiment of the application further provides a method for information configuration. Since this method corresponds to the method corresponding to the network device in a system for information configuration and data transmission of the embodiments of the application and the principle solving the problem of this method is similar to that of the device, the implementations of this method can refer to the implementations of the user equipment, and the repeated description thereof will be omitted here.

As shown in FIG. 8, a flow chart of a method for information configuration provided by an embodiment of the application includes the following steps.

Step 800: a network device determines the indication information for indicating the priority of a channel corresponding to a measurement gap.

Step 801: the network device configures the indication information for a user equipment, so that the user equipment determines whether to transmit data through the channel according to the priority indicated by the indication information after the channel overlaps with the measurement gap.

In one embodiment, the step in which the network device configures the indication information for the user equipment includes:

the network device configures the indication information for the user equipment through RRC signaling; or the network device configures the indication information for the user equipment through physical layer signaling; or the network device configures the indication information for the user equipment through the configuration information of a logical channel.

In one embodiment, the network device configures the indication information for the user equipment through RRC signaling; and the step in which the network device determines the indication information for indicating the priority of the channel corresponding to the measurement gap includes: the network device determines a parameter of configured grant as the indication information; or the network device determines the priority information of PUCCH transmission as the indication information.

In one embodiment, when the priority information of the PUCCH transmission is the priority information of a CSI report, then the indication information is used to indicate the priority of a channel corresponding to the CSI corresponding to the measurement gap; or when the priority information of the PUCCH transmission is the priority information of an SR, then the indication information is used to indicate the priority of a channel carrying the SR corresponding to the measurement gap; or when the priority information of the PUCCH transmission is the priority information of an HARQ feedback, then the indication information is used to indicate the priority of a channel carrying the HARQ feedback corresponding to the measurement gap.

In one embodiment, the priority information of the PUCCH transmission is the priority information of the SR; and the step in which the network device configures the indication information for the user equipment through RRC signaling includes: the network device transmits the SR configuration information to the user equipment through RRC signaling, and the SR configuration information includes the priority information of the SR.

In one embodiment, the indication information is used to indicate the priority of one of a PDSCH, a PUSCH and a PUCCH corresponding to the measurement gap.

In one embodiment, when the network device configures the indication information for the user equipment through RRC signaling; or the network device configures the indication information for the user equipment through physical layer signaling, the network device indicates the priority of the channel corresponding to the measurement gap by setting a value of priority or flag.

In one embodiment, when the network device configures the indication information for the user equipment through the configuration information of the logical channel, the indication information is used to indicate the priority of a PUSCH corresponding to the measurement gap or indicate the priority of a PUCCH corresponding to the measurement gap.

In one embodiment, when the network device configures the indication information for the user equipment through the configuration information of the logical channel, the indication information is a part or all of:

the priority information;

the flag;

the maximum duration of a PUSCH configured for the logical channel;

an SCS configured for the logical channel;

the information for indicating whether the logical channel allows the use of pre-configured grant;

the information for indicating whether the logical channel allows repeated transmission.

In one embodiment, the logical channel is a logical channel used for triggering SR configuration.

In one embodiment, the method further includes: the network device configures a duration for the user equipment, so that the user equipment stops measuring in the measurement gap within the duration after transmitting data through the channel according to the priority indicated by the indication information when the channel overlaps with the measurement gap.

Based on the same inventive concept, an embodiment of the application further provides a method for data transmission. Since this method corresponds to the method corresponding to the user equipment in a system for information configuration and data transmission of the embodiments of the application and the principle solving the problem of this method is similar to that of the device, the implementations of this method can refer to the implementations of the user equipment, and the repeated description thereof will be omitted here.

As shown in FIG. 9, a flow chart of a method for data transmission provided by an embodiment of the application includes the following steps.

Step 900: a user equipment receives the indication information configured by a network device to indicate the priority of a channel corresponding to a measurement gap.

Step 901: the user equipment transmits data through the channel when the channel overlaps with the measurement gap and when determining that the priority of the channel is higher than the priority of the measurement gap according to the indication information.

In one embodiment, the step in which the user equipment receives the indication information configured by the network device to indicate the priority of the channel corresponding to the measurement gap includes: the user equipment receives the indication information configured by the network device through RRC signaling; or the user equipment receives the indication information configured by the network device through physical layer signaling; or the user equipment determines the indication information from the received configuration information of a logical channel transmitted by the network device.

In one embodiment, when the user equipment receives the indication information configured by the network device through RRC signaling, the indication information is a parameter of the configured grant or the priority information of PUCCH transmission.

In one embodiment, when the priority information of the PUCCH transmission is the priority information of a CSI report, the indication information is used to indicate the priority of a channel corresponding to the CSI corresponding to the measurement gap; or when the priority information of the PUCCH transmission is the priority information of an SR, the indication information is used to indicate the priority of a channel carrying the SR corresponding to the measurement gap; or when the priority information of the PUCCH transmission is the priority information of an HARQ feedback, the indication information is used to indicate the priority of a channel carrying the HARQ feedback corresponding to the measurement gap.

In one embodiment, the priority information of the PUCCH transmission is the priority information of the SR; and the step in which the user equipment receives the indication information configured by the network device through RRC signaling includes: the user equipment receives the SR configuration information transmitted by the network device through RRC signaling, and determines the priority information of the SR from the SR configuration information.

In one embodiment, the indication information is used to indicate the priority of one of a PDSCH, a PUSCH and a PUCCH corresponding to the measurement gap.

In one embodiment, when the user equipment receives the indication information through RRC signaling or receives the indication information through physical layer signaling, the user equipment determines the priority of the channel corresponding to the measurement gap according to a value of priority information or flag.

In one embodiment, when the user equipment determines the indication information from the configuration information of the logical channel, the indication information is used to indicate the priority of a PUSCH corresponding to the measurement gap or indicate the priority of a PUCCH corresponding to the measurement gap.

In one embodiment, when the user equipment determines the indication information through the configuration information of the logical channel, the user equipment determines the priority of the channel corresponding to the measurement gap by a part or all of:

when the indication information includes priority, the user equipment determines the priority of the channel corresponding to the measurement gap through a value of priority;

when the indication information includes flag, the user equipment determines the priority of the channel corresponding to the measurement gap through a value of flag;

when the indication information includes the maximum duration of a PUSCH configured for the logical channel, the user equipment determines whether the maximum duration of the PUSCH corresponding to the logical channel is lower than a first threshold, and if so, determines that the priority of the channel is higher than the priority of the measurement gap;

when the indication information includes an SCS configured for the logical channel, the user equipment determines whether the SCS configured for the logical channel is higher than a second threshold, and if so, determines that the priority of the channel is higher than the priority of the measurement gap;

when the indication information includes information for indicating whether the logical channel allows the use of pre-configured grant, the user equipment determines whether the logical channel allows the use of pre-configured grant, and if so, determines that the priority of the channel is higher than the priority of the measurement gap;

when the indication information includes information for indicating whether the logical channel allows repeated transmission, the user equipment determines whether the logical channel allows repeated transmission, and if so, determines that the priority of the channel is higher than the priority of the measurement gap.

In one embodiment, the logical channel is a logical channel used for triggering SR configuration.

In one embodiment, the method further includes: the user equipment determines a duration configured by the network device; and the user equipment stops measuring in the measurement gap within the duration after transmitting data through the channel according to the priority indicated by the indication information when the channel overlaps with the measurement gap.

The application has been described above by reference to the block diagrams and/or flow charts showing the methods, devices (systems) and/or computer program products according to the embodiments of the application. It should be understood that one block shown in the block diagrams and/or flow charts and a combination of the blocks shown in the block diagrams and/or flow charts can be implemented by the computer program instructions. These computer program instructions can be provided to a general-purpose computer, a processor of a dedicated computer and/or another programmable data processing unit to produce a machine, so that the instructions executed by the computer processor and/or another programmable data processing unit create the methods for implementing the functions and/or actions specified in the blocks of the block diagrams and/or flow charts.

Accordingly, the application can also be implemented by the hardware and/or software (including the firmware, resident software, microcode and the like). Further, the application can adopt the form of computer program products on the computer usable or computer readable storage medium, which has the computer usable or computer readable program codes implemented in the medium, to be used by the instruction execution system or used in combination with the instruction execution system. In the context of the application, the computer usable or computer readable storage medium can be any medium, which can contain, store, communicate with, transmit or transfer the programs, to be used by the instruction execution system, apparatus or device, or used in combination with the instruction execution system, apparatus or device.

What is claimed is:

1. A method for information configuration, comprising:
determining, by a network device, indication information for indicating a priority of a channel corresponding to a measurement gap; wherein the indication information indicates a priority of one of a Physical Downlink Shared Channel (PDSCH), a Physical Uplink Shared Channel (PUSCH), and a Physical Uplink Control Channel (PUCCH) corresponding to the measurement gap;
configuring, by the network device, the indication information for a user equipment, wherein whether to transmit data through the channel is determined according to the priority indicated by the indication information when the channel overlaps with the measurement gap;
wherein configuring, by the network device, the indication information for the user equipment, comprises:
configuring, by the network device, the indication information for the user equipment through Radio Resource Control (RRC) signaling, wherein when the indication information is a parameter of configured grant, the indication information is a priority parameter of the configured grant or a flag parameter of the configured grant; or when the indication information is priority information of PUCCH transmission, and the priority information of the PUCCH transmission is priority information of a Channel Status Indicator (CSI) report, the indication information indicates a priority of a channel corresponding to the CSI corresponding to the measurement gap; or when the indication information is priority information of PUCCH transmission, and the priority information of the PUCCH transmission is priority information of a Hybrid Automatic Repeat reQuest (HARQ) feedback, the indication information indicates a priority of a channel carrying the HARQ feedback corresponding to the measurement gap; or
configuring, by the network device, the indication information for the user equipment through physical layer signaling, wherein the indication information comprises a priority parameter or flag parameter in a DCI signaling; wherein the priority parameter indicates the priority of the channel corresponding to the measurement gap; or configuring, by the network device, the indication information for the user equipment through configuration information of a logical channel, wherein the indication information comprises a part or all of: a flag parameter of the logical channel, a maximum duration of the PUSCH corresponding to the logical channel, a Subcarrier Space (SCS) configured for the logical channel, information for indicating whether the logical channel allows a use of pre-configured grant, or information for indicating whether the logical channel allows repeated transmission.

2. The method of claim 1, wherein when the network device configures the indication information for the user equipment through the configuration information of the logical channel, the indication information indicates a priority of a PUSCH corresponding to the measurement gap or indicate a priority of a PUCCH corresponding to the measurement gap;
wherein the logical channel is a logical channel for triggering Scheduling Request (SR) configuration.

3. The method of claim 1, wherein the method further comprises:
configuring, by the network device, a duration for the user equipment, so that the user equipment stops measuring in the measurement gap within the duration after transmitting data through the channel according to the priority indicated by the indication information when the channel overlaps with the measurement gap.

4. A method for data transmission, comprising:
receiving, by a user equipment, indication information configured by a network device to indicate a priority of a channel corresponding to a measurement gap, wherein the indication information indicates a priority of one of a Physical Downlink Shared Channel (PDSCH), a Physical Uplink Shared Channel (PUSCH) and a Physical Uplink Control Channel (PUCCH) corresponding to the measurement gap;
transmitting, by the user equipment, data through the channel when the channel overlaps with the measurement gap and when determining that the priority of the channel is higher than a priority of the measurement gap according to the indication information;
wherein receiving, by the user equipment, indication information configured by the network device to indicate the priority of the channel corresponding to the measurement gap, comprises:
receiving, by the user equipment, the indication information configured by the network device through Radio Resource Control (RRC) signaling, wherein when the indication information is a parameter of configured grant, the indication information is a priority parameter of the configured grant or a flag parameter of the configured grant; or when the indication information is priority information of PUCCH transmission, and the priority information of the PUCCH transmission is priority information of a Channel Status Indicator (CSI) report, the indication information indicates a priority of a channel corresponding to the CSI corresponding to the measurement gap; or when the indication information is priority information of PUCCH transmission, and the priority information of the PUCCH transmission is priority information of a Hybrid Automatic Repeat reQuest (HARQ) feedback, the indication information indicates a priority of a channel carrying the HARQ feedback corresponding to the measurement gap; or receiving, by the user equipment, the indication information configured by the network device through physical layer signaling, wherein the indication information comprises a priority parameter or flag parameter in a DCI signaling; wherein the priority parameter indicates the priority of the channel corresponding to the measurement gap; or determining, by the user equipment, the indication information from received configuration information of a logical channel transmitted by the network device, wherein the indication information comprises a part or all of: a flag parameter of the logical channel, a maximum duration of the PUSCH corresponding to the logical channel, a Subcarrier Space (SCS) configured for the logical channel, information for indicating whether the logical channel allows a use of pre-configured grant, or information for indicating whether the logical channel allows repeated transmission.

5. The method of claim 4, wherein when the user equipment determines the indication information from the configuration information of the logical channel, the indication information indicates a priority of a PUSCH corresponding to the measurement gap or indicate a priority of a PUCCH corresponding to the measurement gap;

wherein the logical channel is a logical channel for triggering Scheduling Request (SR) configuration.

6. The method of claim 5, wherein when user equipment determines indication information through configuration information of a logical channel, the user equipment determines a priority of the channel corresponding to a measurement gap by a part or all of:

when the indication information comprises flag, the user equipment determines the priority of the channel corresponding to the measurement gap through a value of flag;

when the indication information comprises a maximum duration of a PUSCH configured for the logical channel, the user equipment determines whether the maximum duration of the PUSCH corresponding to the logical channel is lower than a first threshold, and if so, determines that the priority of the channel is higher than the priority of the measurement gap;

when the indication information comprises an SCS configured for the logical channel, the user equipment determines whether the SCS configured for the logical channel is higher than a second threshold, and if so, determines that the priority of the channel is higher than the priority of the measurement gap;

when the indication information comprises information for indicating whether the logical channel allows for a pre-configured grant, the user equipment determines whether the logical channel allows for the pre-configured grant, and if so, determines that the priority of the channel is higher than the priority of the measurement gap;

when the indication information comprises information for indicating whether the logical channel allows repeated transmission, the user equipment determines whether the logical channel allows repeated transmission, and if so, determines that the priority of the channel is higher than the priority of the measurement gap.

7. The method of claim 4, further comprising:

determining, by the user equipment, a duration configured by the network device; and stopping, by the user equipment, measuring in the measurement gap within the duration after transmitting data through the channel according to the priority indicated by the indication information when the channel overlaps with the measurement gap.

8. A user equipment for data transmission, comprising a processor, a memory and a transceiver;

wherein the processor is configured to read a program in the memory and perform the method according to claim 4.

9. A network device for information configuration, comprising: a processor, a memory and a transceiver;

wherein the processor is configured to read a program in the memory and perform:

determining indication information for indicating a priority of a channel corresponding to a measurement gap; wherein the indication information indicates a priority of one of a Physical Downlink Shared Channel (PDSCH), a Physical Uplink Shared Channel (PUSCH), and a Physical Uplink Control Channel (PUCCH) corresponding to the measurement gap; and configuring the indication information for a user equipment, wherein whether to transmit data through the channel is determined according to the priority indicated by the indication information when the channel overlaps with the measurement gap;

wherein the processor is further configured to:

configure the indication information for the user equipment through Radio Resource Control (RRC) signaling, wherein when the indication information is a parameter of configured grant, the indication information is a priority parameter of the configured grant or a flag parameter of the configured grant; or when the indication information is priority information of PUCCH transmission, and the priority information of the PUCCH transmission is priority information of a Channel Status Indicator (CSI) report, the indication information indicates a priority of a channel corresponding to the CSI corresponding to the measurement gap; or when the indication information is priority information of PUCCH transmission, and the priority information of the PUCCH transmission is priority information of a Hybrid Automatic Repeat reQuest (HARQ) feedback, the indication information indicates a priority of a channel carrying the HARQ feedback corresponding to the measurement gap; or configure the indication information for the user equipment through physical layer signaling, wherein the indication information comprises a priority parameter or flag parameter in a DCI signaling; wherein the priority parameter indicates the priority of the channel corresponding to the measurement gap; or configure the indication information for the user equipment through configuration information of a logical channel, wherein the indication information comprises a part or all of: a flag parameter of the logical channel, a maximum duration of the PUSCH corresponding to the logical channel, a Subcarrier Space (SCS) configured for the logical channel, information for indicating whether the logical channel allows a use of pre-configured grant, or information for indicating whether the logical channel allows repeated transmission.

* * * * *